2 Sheets--Sheet 1.

J. R. DAVIES.
Improvement in Molds for Casting.

No. 131,214. Patented Sep. 10, 1872.

Witnesses.
Harry King.
H. H. Dodge.

Inventor.
John R. Davies.
by Dodge & Munn
Attys

2 Sheets--Sheet 2.
J. R. DAVIES.
Improvement in Molds for Casting.
No. 131,214. Patented Sep. 10, 1872.
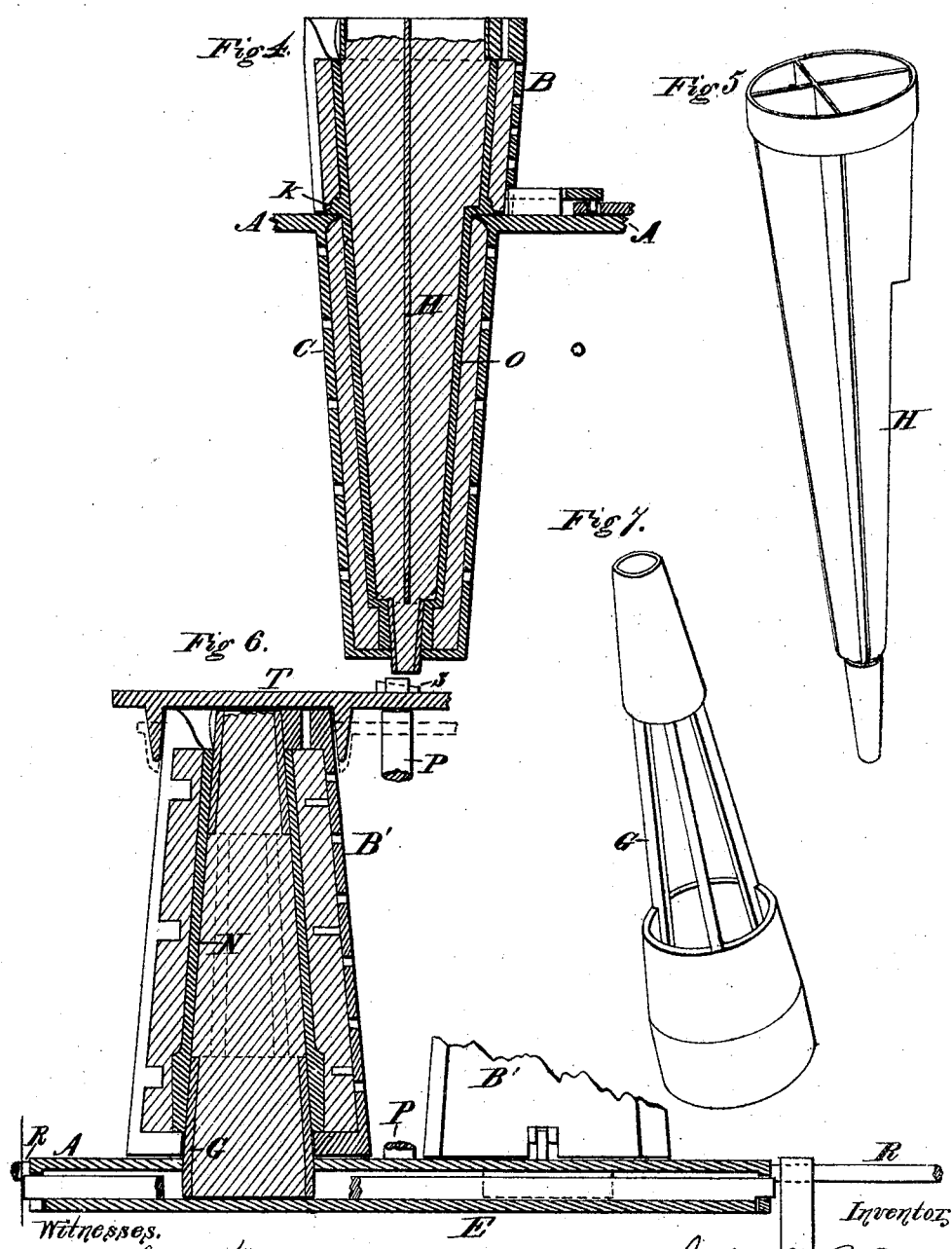
Witnesses.
Harry King
H. H. Dodge.
Inventor.
John R. Davies
by Dodge & Munn
Attys.

UNITED STATES PATENT OFFICE.

JOHN R. DAVIES, OF RACINE, WISCONSIN.

IMPROVEMENT IN MOLDS FOR CASTING.

Specification forming part of Letters Patent No. 131,214, dated September 10, 1872.

SPECIFICATION.

*To all whom it may concern:*

Be it known that I, JOHN R. DAVIES, of Racine, in the county of Racine and State of Wisconsin, have invented certain Improvements in Molds for Castings, of which the following is a specification, reference being had to the accompanying drawing:

My invention has for its object the production of castings in a more speedy and cheap manner than by the ordinary methods; and, to this end, it consists mainly in constructing the molds in sections and arranging them in such a manner that they can be opened and closed by mechanical means.

Figure 1:
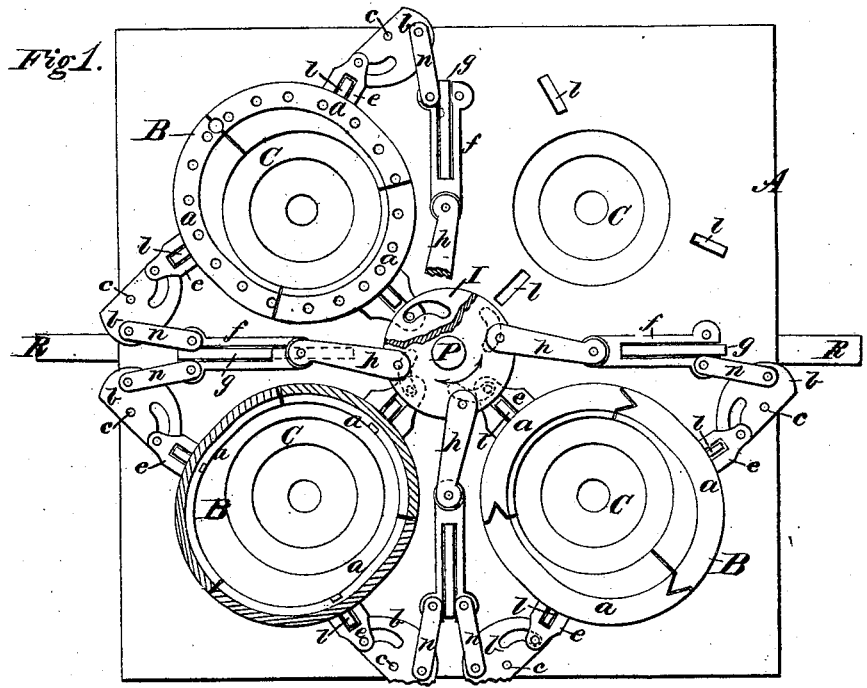
Figure 2:
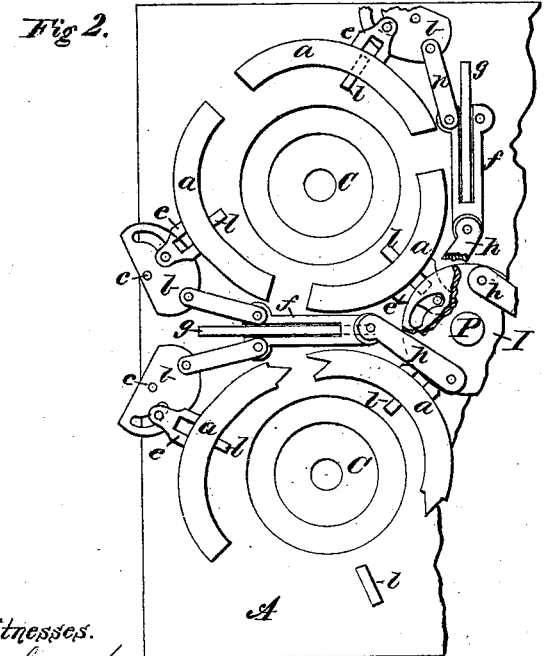
Figure 3:
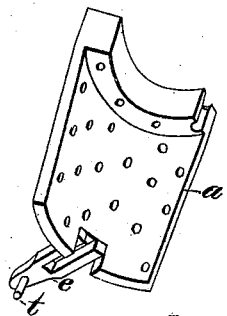

Figure 1 is a top-plan view of a set of my improved molds closed, ready for use. Fig. 2 is a view of a portion of a set of the molds opened. Fig. 3 is a perspective view of a section of a mold detached. Figs. 4, 5, 6, and 7 are views of portions shown in detail.

In carrying out my invention I provide a base-plate, A, upon which the molds are placed, as shown in Figs. 1 and 6, when the mold is of such a nature or construction that it can be best located above the base-plate. In some cases, however, it may be necessary or more convenient to locate the mold in such a manner that a portion of it shall project below the base-plate, as represented in Fig. 4, in which case the lower part $c$ of the mold may be cast with or attached to the base-plate, the plate being provided with trunnions R, as represented in Figs. 1 and 6, for supporting it in any suitable frame, and also for turning it over, when required. The molds, or that portion of them which is above the base-plate, I make in sections, they being divided vertically into three or more parts, one of which is shown detached in Fig. 3. Each of these sections has a slotted arm, $e$, projecting radially from its outside, and upon the base-plate, at the proper point, is secured a projection, $l$, as shown in Figs. 1 and 2, this projection fitting into the slot or groove in the arm $e$ so as to serve as a guide for the section $a$ of the mold when the latter is moved on the base-plate, there being, of course, one of these guides for each section of the mold, and they being arranged radially around the center of the mold, as shown clearly in the upper right-hand corner of Fig. 1, so that as the sections are moved toward the center they will be brought together, and as they are moved back they will separate, thus opening the mold, as represented in plan in Fig. 2.

The molds thus constructed I propose to arrange in nests or sets, more or less in number, Fig. 1 representing a set of four. In the center, between the molds composing the set, I pivot a disk, I, from the center of which a rod, P, extends upward, terminating a little above the top of the molds. (See Fig. 6.) This disk I is provided with a series of curved slots arranged eccentrically, as shown in Fig. 1, in which pins on the arms $e$ of the inner sections $a$ work, so that by turning the disk I these sections are moved in or out. To operate the other sections of the mold a plate, $b$, is pivoted upon the base-plate directly in their rear, and these plates $b$ are also provided with a similar eccentric slot, in which the pin of their arms $e$ engages; so that, by turning these plates $b$ on their pivots $c$, they will move the corresponding sections of the mold. In order to operate these simultaneously with the other section I connect the plates $b$ to the disk I by means of a rod, $n$, which is pivoted to a slide, $f$, working on a guide, $g$, this slide $f$ being in turn connected by a second rod, $h$, to the disk I, so that, when the central rod P is turned in one direction, all the sections $a$ of all the molds will be moved outward, thus opening them all at once, and when turned in the opposite direction they will all be closed simultaneously.

It is obvious that other mechanical means may be substituted for the devices above described, for opening and closing the molds, the only requisite being that they shall have imparted to them the motions described. The joints between the sections $a$ may be plain ones, or they may be made V-shaped, so as to lock into each other when closed, as represented in Fig. 1.

For the purpose of a continuous operation the molds are to be lined with suitable compositions, composed of fire-clay and plumbago, or any similar material that will answer the purpose. The lining is applied as follows: The mold being in place, the pattern is inserted, and the lining applied in a plastic condition. The mold is then closed, thereby pressing upon the interior surface of the lining the exact form of the pattern, care being taken to have the space between the pattern and the body of the mold perfectly filled; and to prevent the lining in the different sections from being united, thin strips of steel, ground to an edge, are inserted between the sections. To hold the lining securely in the molds the latter may have projections on their inner surfaces, to be embedded in the lining, as represented in Fig. 6; or the molds may be formed with holes in them, through which a portion of the lining material may protrude, and thus hold it fast. When the mold has been thus formed, the lining is suitably hardened by heating or drying it in a furnace or otherwise. The body of the molds I ordinarily make of cast-iron; but when it is desired to cast steel in them, they are to be made of copper, for the reason that it will retain heat longer than those made of iron. When dried, the lining is to be coated with some substance that will impart to their interior a smooth surface. For this purpose a composition of fish-oil, resin, and lamp-black, heated and mixed, may be used, it being applied with a brush; or, fish-oil, plumbago, and pulverized charcoal may be used; or they may be coated with soot by burning pitch under them and letting the smoke enter them.

It is, of course, obvious that the molds must be varied in form to correspond with the articles to be made; and in cases where the mold is small and light it may be corrugated, or cast with ribs to strengthen it, and keep it from warping or springing out of shape; and in all cases they should be perforated to permit the gas or steam to escape, especially when the molds are filled with sand instead of the permanent lining, as it is obvious this style of molds may be used with sand also.

In some cases it may be necessary to arrange sectional molds on both sides of the base-plate; and it is obvious that they may be so arranged, and both sets be operated, as above described, by duplicating the operating mechanism.

In the present case I have represented the molds constructed for casting the thimble-skeins and boxes now so generally used on wagons. In Fig. 4 is shown a mold for casting the skein O. In this case the lower part C of the mold projects below the base-plate, the latter being at the point where the shoulder is formed on the skein, while in the bottom of the mold is a hole to receive and hold in position the lower end of the core H, which is shown detached in Fig. 5. The mold for casting the box N is represented in Fig. 6. In this case the mold B' is all located above the base-plate, the core G—shown detached in Fig. 7—protruding through the base-plate, and resting on the under plate E, which is arranged to be detached as soon as the metal is poured, so as to let the core fall out. As these devices form the subject of a separate application, they need not be further described, they being referred to here merely for the purpose of illustrating my invention more fully. A top plate, T, Fig. 6, is provided with flanges or lugs on its under side to fit over the molds and clamp the sections firmly together when the metal is to be poured, this plate T having a hole at its center, through which the center rod projects, with a key, S, or similar means for fastening the plate down. This top plate, instead of having the flanges or lugs mentioned, may have holes cut through it to fit over the upper end of the molds, as represented in dotted lines in Fig. 6, by which means it will serve the same purpose; the upper end or body of the mold being made tapering, so that when the plate is crowded down it will force the sections together and hold them snug and tight.

By this method of constructing and operating molds the process of casting is rendered continuous, the same mold being used repeatedly without change; and thus a few sets of such molds will keep a cupola employed all the time.

Having thus described my invention, what I claim is—

1. A mold for casting metals, composed of three or more sections, arranged to open and close, substantially as described, whereby all strips or similar devices for packing the joints are dispensed with, and the mold adapted for repeated and continuous use, as set forth.

2. The metallic base plate A, having one or more sectional molds, B, with the mechanism for opening and closing the same arranged thereon, substantially as described.

3. The combination, of a cluster or series of sectional molds, with an operating mechanism, substantially such as described, whereby all the molds composing the cluster or series can be opened or closed simultaneously, substantially as set forth.

4. The base-plate A, provided with trunnions R, as and for the purpose set forth.

5. The combination of the mold B, base plate A, and the detachable plate E, arranged and operated as set forth.

6. The clamping or top plate T, in combination with the molds B and base plate A, all arranged to operate as set forth.

JNO. R. DAVIES.

Witnesses:
J. McKENNEY,
W. C. DODGE.